United States Patent [19]
Chou

[11] Patent Number: 5,823,228
[45] Date of Patent: Oct. 20, 1998

[54] VALVE MANIFOLD

[75] Inventor: Alan F. Chou, Sugar Land, Tex.

[73] Assignee: Keystone International Holdings Corp., Houston, Tex.

[21] Appl. No.: 794,975

[22] Filed: Feb. 5, 1997

[51] Int. Cl.$^6$ .................................................. E03B 11/00
[52] U.S. Cl. ......................... 137/597; 137/557; 137/884
[58] Field of Search .................................. 137/597, 884, 137/557

[56] References Cited

U.S. PATENT DOCUMENTS

| | | |
|---|---|---|
| 4,466,290 | 8/1984 | Frick . |
| 4,602,657 | 7/1986 | Anderson, Jr. . |
| 4,672,728 | 6/1987 | Nimberger . |
| 5,117,867 | 6/1992 | Adams . |
| 5,277,224 | 1/1994 | Hutton et al. . |

OTHER PUBLICATIONS

One–page Flyer: "'Safti–Fold®' 3 Valve Unimount".
Four–page Flyer: "Minimatic Three Valve Manifold." DA Mfg. Co. Tulia, Texas. Jun. 20, 1978.
One–page Flyer: "Five Valve Manifold".
Catalogue: "Manifolds." Century Valve Ltd. Calgary, Alberta, Canada.
Catalogue: "Instrumentation Manifolds; The World Standard." Parker Hannifin Corporation. Jacksonville, Alabama.

*Primary Examiner*—Henry A. Bennett
*Assistant Examiner*—Ramyar Farid
*Attorney, Agent, or Firm*—Browning Bushman

[57] ABSTRACT

A valve manifold having a manifold body with a first face, an opposed, substantially planar second face, and a peripheral wall, a first inlet, a second inlet, a first drain port, and a second drain port being formed in the first face, a first outlet and a second outlet being formed in the second face, there being a first, fluid communication pathway/valve for controlling fluid flow between the first outlet and the second outlet, a second, fluid communication pathway/valve for controlling fluid flow between the first inlet and the first outlet, a third, fluid communication pathway/valve for controlling fluid flow between said first drain port and said first outlet, a fourth, fluid communication pathway/valve for controlling fluid flow between the second inlet and the second outlet, a fifth, fluid communication pathway/valve for controlling fluid flow between the second drain port and the second outlet, flow paths opening into the outlets sloping away from said second face.

9 Claims, 4 Drawing Sheets

VALVE MANIFOLD

BACKGROUND OF THE INVENTION

1. Field of the Invention

The present invention relates to a valve manifold for controlling flow between a main flow line and a pressure sensor and, more specifically, to such a valve manifold that is self-draining.

2. Description of the Prior Art

It is often desirable to determine the flow or pressure of a fluid, e.g., a gas, through a main flow line, e.g., a pipeline. Typically, this can be accomplished by a flow restriction disposed in the main flow line, there being pressure taps on each side of the restriction for obtaining high and low fluid pressures. Such a flow restriction may comprise an orifice plate, a flow nozzle, a venturi tube, etc. The high and low pressures taken from opposed sides of the flow restriction in the main flow line are detected by a pressure sensor/transmitter assembly that measures and transmits the measured pressures or pressure differential by a suitable mechanical or electronic signal or the like to a remote location, e.g., a control room, where the pressure or pressure differential may be monitored and/or recorded by an operator.

A valve manifold is normally mounted between the main flow line and the pressure sensor. The manifold is used to control flow to the pressure sensor while permitting blocking, venting, zero checks, and calibration. The manifold typically includes a plurality of valves, each movable between open and closed positions relative to a flow pathway in the manifold so as to control the flow of fluid through the pathway.

Fluid pressure sensor/transmitters, particularly such sensor/transmitters of the differential pressure type typically employ diaphragms in both the low and high pressure inlets to the pressure sensor to detect the high and low pressures to which they are exposed. As disclosed in U.S. Pat. No. 5,277,224, it is desirable, in order to minimize leak paths, to minimize the interface connections between the pressure sensor and the main flow line. As also taught in U.S. Pat. No. 5,277,224, this can be accomplished, in part, by directly coupling the valve manifold to the pressure sensor. While this reduces leak paths and the space required for the manifold/pressure sensor system, it can pose significant problems.

Pressure sensors of the type under consideration typically employ diaphragms. These diaphragms are extremely fragile, expensive, and difficult to install in the pressure sensor. Further, in cases where the valve manifold and pressure sensor are directly coupled to one another, the diaphragms are closely positioned to the face of the manifold to which the pressure sensor is attached. In these direct coupled manifold/pressure sensor assemblies, one face of the manifold, referred to as the instrument face, sealingly abuts a face of the pressure sensor. The instrument face of the manifold is provided with a low pressure outlet and a high pressure outlet, both of which are relatively shallow, cylindric cavities. The cylindric cavities are in register with low pressure and high pressure inlets, respectively, in the face of the pressure sensor sealingly abutted by the instrument face of the manifold. The diaphragms are positioned in the low pressure and high pressure inlets of the pressure sensor close to the mouths thereof. Accordingly, when the manifold and pressure sensor are mated, the cylindric cavities cooperate with the diaphragms to form generally cylindric chambers of a small cylindrical height relative to the cylindrical diameter.

Although manifold/pressure sensor assemblies of the type under consideration can be mounted in a variety of ways, it is common, when the fluid pressure being measured is a gas, to mount the manifold such that the instrument face is generally horizontal and facing up, the pressure sensor accordingly being mounted above the manifold. It is not uncommon when measuring gas pressures for there to be condensation of liquids in the manifold, which occurs either during or after pressure measurements. Any liquid remaining in the relatively shallow cylindric chambers described above, if not removed, may interfere with subsequent pressure measurements, can cause corrosion of the metal diaphragms, or in certain, adverse climatic conditions, freeze and rupture the diaphragms. Accordingly, it becomes expedient, to the extent possible, that any liquid that collects in the manifold, by whatever mechanism, be removed. In particular, any liquid remaining in the cylindric chambers must be removed to avoid the problems discussed above.

In cases where the manifold is utilized in pressure measurements on a liquid source, the instrument face of the manifold is generally likewise disposed in a horizontal plane but is facing downward rather than upward as in the case with gas measurements, the pressure sensor/transmitter being mounted below the manifold. In measuring liquid pressures, it is important, for accuracy of measurement, that the liquid in the cylindric chambers be free of gas bubbles, which could collect on the diaphragm surface, giving a false reading. Accordingly, it is clearly desirable for the manifold to be designed such that any gas bubbles in the cylindric chambers be provided with escape pathways that slope upward from the instrument face of the manifold so that any gas bubbles in the liquid can rise out of the cylindric chambers, away from the diaphragm faces.

It is common in prior art manifold design, in order to form the relatively complex passageway system, to utilize "construction holes," which are simply bores in the manifold body that allow passageways to be drilled and interconnected with other passageways. These construction holes, even though they are plugged, are a potential source of leakage. Alternately, they frequently provide dead spaces within the manifold body where liquid and gas bubbles can collect. Thus, elimination of the construction holes eliminates one possible source of leakage and liquid collection or pooling in the manifold body.

SUMMARY OF THE INVENTION

It is therefore an object of the present invention to provide an improved valve manifold.

Another object of the present invention is to provide a valve manifold for use with pressure sensors of the differential pressure type.

Still a further object of the present invention is to provide a self-draining valve manifold.

Another object of the present invention is to provide a wafer-type valve manifold that eliminates the need for construction holes or other such bores to accommodate drilling of and interconnection of internal passageways.

The above and other objects of the present invention will be apparent from the drawings, the description, and the appended claims.

The valve manifold of the present invention is adapted to be positioned between a main flow line and a pressure sensor to control fluid flow from the main flow line to the pressure sensor. The manifold has a body with a first face, an opposed, substantially planar second face, and a peripheral wall. A high pressure inlet, a low pressure inlet, a high pressure drain port, and a low pressure drain port are formed in the first face, while a high pressure outlet and a low pressure outlet are formed in the second face. An equalizer valve cavity is formed in the peripheral wall and is provided with an equalizer valve that controls fluid communication between the high pressure outlet and the low pressure outlet. A high pressure block valve cavity is also formed in the peripheral wall, the high pressure block valve cavity, the high pressure inlet, and the high pressure valve being interconnected, a high pressure block valve being disposed in the high pressure block valve cavity to control fluid communication between the high pressure inlet and the high pressure outlet. A high pressure vent valve cavity is formed in a first, substantially planar, side surface of the peripheral wall, the first, side surface being at an acute angle relative to the second face of the manifold body. A straight, high pressure vent passageway connects the high pressure vent valve cavity and the high pressure outlet, the high pressure vent passageway sloping in a direction away from the second face and being substantially normal to the first side surface. The high pressure vent valve cavity and the high pressure drain port are connected, flow therebetween being controlled by a high pressure vent valve disposed in the high pressure vent valve cavity. In like manner to the high pressure arrangement discussed above, the manifold further includes a low pressure block valve cavity formed in the peripheral wall, the low pressure block valve cavity, the low pressure inlet, and the low pressure outlet being interconnected, a low pressure block valve being disposed in the low pressure block valve cavity to control fluid communication between the low pressure inlet and the low pressure outlet. Likewise, a low pressure vent valve cavity is formed in a second, substantially planar side surface of the peripheral wall, the second side surface also being at an acute angle relative to the second face of the manifold body. A straight, low pressure vent passageway connects the low pressure vent valve cavity and the low pressure outlet, the low pressure vent passageway sloping in a direction away from the second face and being substantially normal to the second side surface. The low pressure vent valve cavity and the low pressure drain port are connected, flow therebetween being controlled by a low pressure vent valve disposed in the low pressure vent valve cavity.

BRIEF DESCRIPTION OF THE DRAWINGS

The invention can best be understood with reference to the drawings in which.

DESCRIPTION OF THE PREFERRED EMBODIMENTS

The valve manifold of the present invention will be described, in part, with reference to a high pressure flow pathway system and a low pressure flow pathway system, it being understood that such nomenclature is purely for reference purposes only. Accordingly, valves, passageways, or the like described as being "high pressure" could be "low pressure" and vice versa.

Figure 1:
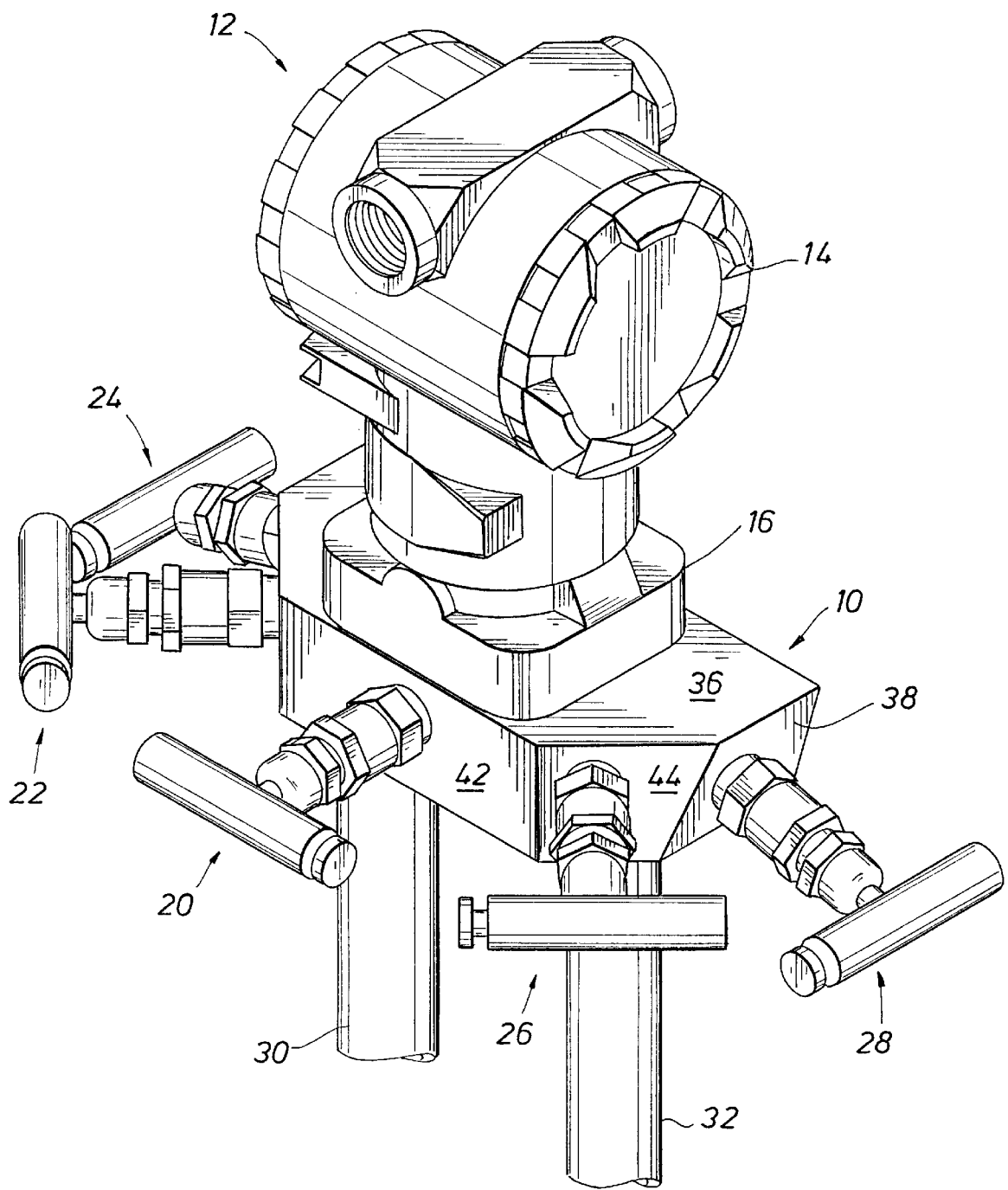
FIG. 1 is a perspective view of the manifold of the present invention shown as being interfaced between a pressure sensor/transmitter and a source of fluid.

With reference first to FIG. 1, the manifold, shown generally as 10, is seen as being directly, sealingly coupled to a differential pressure transmitter, shown generally as 12, the transmitter 12 comprising an input/output unit 14 and a pressure sensor or transducer housing 16 containing a pair of diaphragms (not shown). One example of a suitable differential pressure transmitter 12 is marketed by Rosemount, Inc., Eden Prairie, Minn., as the Model 3051C Differential Pressure Transmitter. It will be understood, however, that the manifold of the present invention can be used with numerous other differential pressure transmitters and, indeed, can be used to interface a source of fluid, the pressure of which is to be measured, with any type of pressure sensing apparatus whether or not such an apparatus incorporates a transmitters, employs diaphragms as the sensing element, etc. As can be seen, transmitter 12 is affixed to manifold 10, in the well known manner, by means of a series of bolts (not shown) that extend through manifold 10 and are received in threaded blind bores (not shown) or throughbores (not shown) in transducer housing 16. Manifold 10 includes five valve assemblies indicated generally as 20, 22, 24, 26, and 28, valve assemblies 20–28 being disposed in a peripheral wall, as described hereafter, of manifold 10. On the face of manifold 10 opposite the face to which transmitter 12 is connected, manifold 10 is connected to first and second conduits 30 and 32, which, in the case where transmitter 12 is of the differential pressure type, would be connected to a main conduit or source of flowing, pressurized fluid in which an orifice plate or the like was disposed, one of the conduits being in fluid communication with the upstream side of the orifice plate, the other of the conduits being in fluid communication with the downstream side of the orifice plate. While in the embodiment shown in FIG. 1, manifold 10 is shown as being connected to the source of flowing pressurized fluid by what are generally referred to as NPT pipe connections, it will be appreciated that other interface connecting means may be employed to connect the manifold 10 to the source of the flowing, pressurized fluid.

As is conventional in valve manifolds of the type under consideration, manifold 10 includes a fluid communication passageway leading from a high pressure fluid inlet to a high pressure fluid outlet, a fluid communication passageway leading from a low pressure fluid inlet to a low pressure fluid outlet and a fluid communication passageway interconnecting the high and low pressure fluid outlets such that either the low or high pressure fluid can be directed to both of the high and low pressure fluid outlets. Additionally, a typical manifold of the type under consideration permits venting of either the high or low pressure passageways while the other of the high or low pressure passageways remains under pressure or, alternately, venting of both of the high and low pressure passageways so that there is zero pressure at the pressure sensor. Controlling flow through the various passageways to accomplish the above operations is accomplished by manipulation of the valves 20–28.

Figure 2:
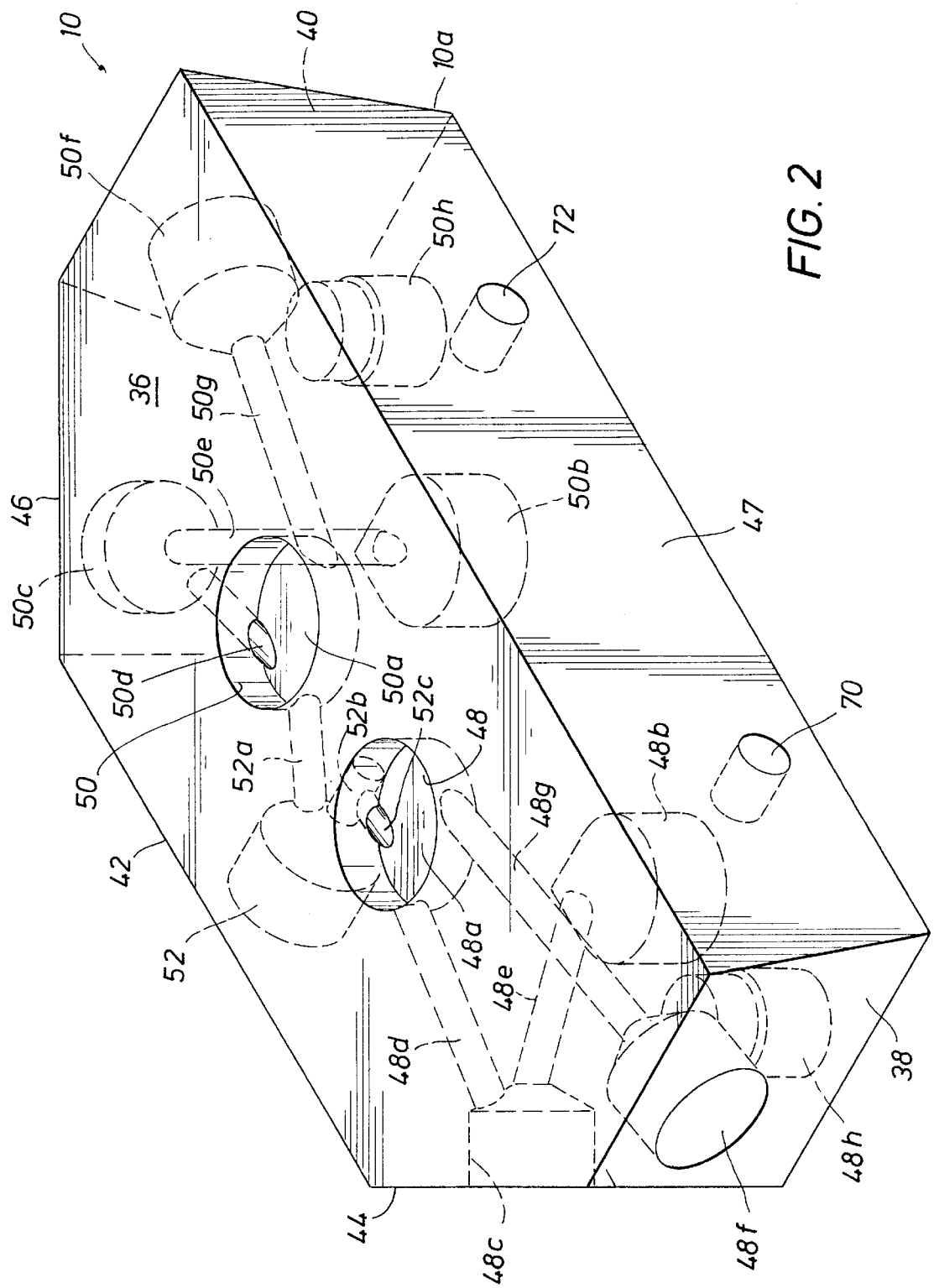
FIG. 2 is an isometric view of the manifold body of the present invention showing one particular porting arrangement.

With reference now to FIG. 2, the manifold 10 is seen to comprise a monolithic, wafer-type body 10a of a suitable high strength material, e.g., metal. As can be seen, manifold body 10a is in the general shape of an elongated hexagon and includes a first face 34 that is preferably substantially planar and an opposed, second face 36 (see FIG. 4) that likewise is substantially planar and preferably parallel to first face 34, second face 36 being referred to as the instrument face. Body 10*a* further includes a peripheral wall comprised of a first, substantially planar, side surface 38, and a second, substantially planar side surface 40, surfaces 38 and 40 being generally opposed to one another at opposite ends of manifold body 10*a*, both of first and second side surfaces 38 and 40 being coincident with respective ones of imaginary planes that form acute angles with an imaginary plane coincident with instrument face 36. The peripheral wall of manifold body 10*a* further includes a third substantially planar side surface 42, a fourth substantially planar side surface 44, and a fifth substantially planar side surface 46, planar side surface 42 being disposed between planar side surfaces 44 and 46. Sixth planar side surface 47 completes the peripheral wall of manifold body 10*a*, sixth surface 47 and third surface 42 being substantially parallel to one another. As can be seen, surfaces 46 and 44 form equal, obtuse angles with third surface 42. As also seen, sixth surface 47 is provided with threaded bores 70 and 72 used with bolts to mount the manifold/transmitter assembly to a suitable bracket or other such mounting means associated with the main flow line/orifice plate assembly.

A high pressure cylindric cavity 48 and low pressure cylindric cavity 50 are formed in instrument face 36 of manifold body 10*a*, cylindric cavities 48 and 50, as shown, being relatively shallow, having short cylindrical heights relative to their cylindrical diameter. High pressure cylindric cavity 48 has a substantially planar bottom 48*a* while low pressure cylindric cavity 50 has a substantially planar bottom 50*a*. High pressure cylindric cavity 48 and low pressure cylindric cavity 50 provide high and low pressure fluid outlets, respectively, from manifold body 10*a* such that when manifold 10 is mated to a pressure sensor such as pressure transmitter 12, cylindric cavities 48 and 50 are in register with respective high and low pressure inlets in the pressure transducer housing 16 of the differential pressure transmitter 12.

First face 34, which can be referred to as the process face of manifold 10, is provided with a high pressure inlet 48*b*, inlet 48*b* being generally cylindrical in nature and can be threaded in the well-known manner to receive a threaded conduit, e.g., a pipe such as NPT pipe 30. Low pressure inlet 50*b*, also formed in first face 34, is generally cylindrical in nature, and, as inlet 48*b*, can be threaded to receive a suitable pipe connection, e.g., NPT pipe 32. Also formed in the face 34 of manifold body 10*a* is a high pressure drain port 48*h* and a low pressure drain port 50*h*, both of such ports 48*h* and 50*h* being generally cylindrical in nature and being threaded if desired.

As is conventional in manifolds of the type under consideration, a fluid communication pathway connects high pressure inlet 48*b* with high pressure outlet 48 and, likewise, a fluid communication pathway connects low pressure inlet 50*b* with low pressure outlet 50.

With reference first to the high pressure pathway, a cylindric, block valve cavity 48*c* is formed in substantially planar, side surface 44, valve cavity 48*c* being threaded in the well-known manner for receipt of a valve such as valve 26 shown in FIG. 1. High pressure block valve cavity 48*c* is connected to high pressure outlet 48 via passageway 48*d*, passageway 48*d*, as shown, being substantially straight, sloping in a direction away from face 36, and opening into cylindric cavity or high pressure outlet 48 at the juncture of the bottom wall 48*a* and the side wall thereof. High pressure block valve cavity 48*c* is also connected to high pressure inlet 48*b* via a straight passageway 48*e*. It will be appreciated that when a valve such as block valve 26 shown in FIG. 1 is threadedly received in valve cavity 48*c*, flow between inlet 48*b* and outlet 48 can be controlled by opening and closing valve 26, valve 26 operating, in the well-known manner, to open or close flow through valve cavity 48*c* between passages 48*d* and 48*e*.

Figure 3:
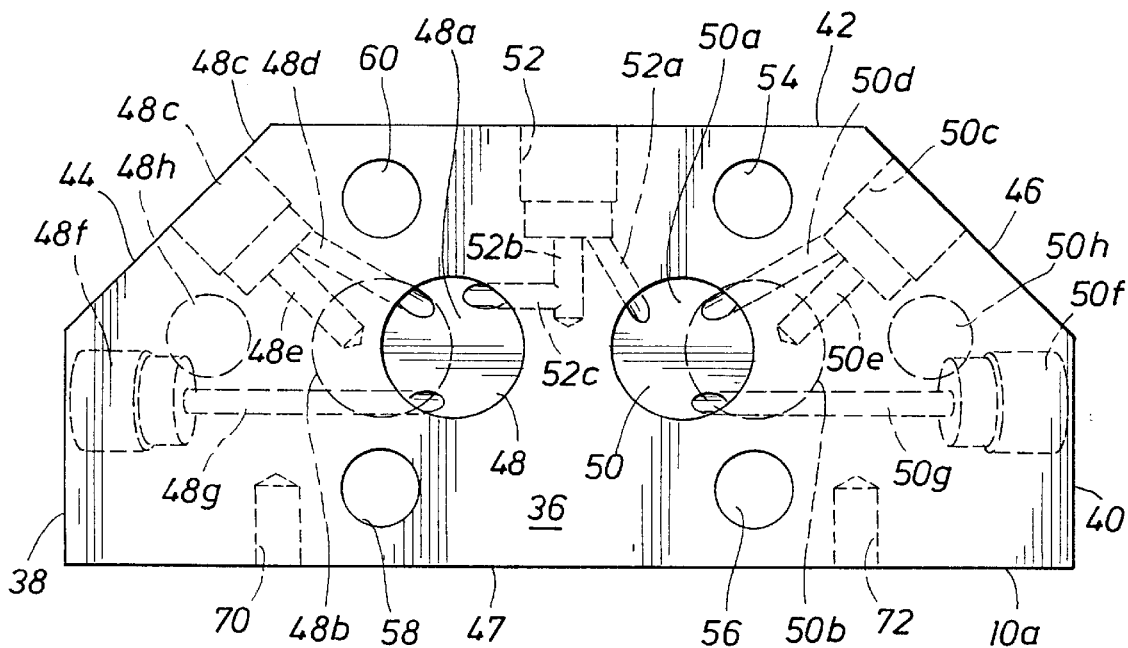
FIG. 3 is a top plan view of the manifold of the present invention.
Figure 4:
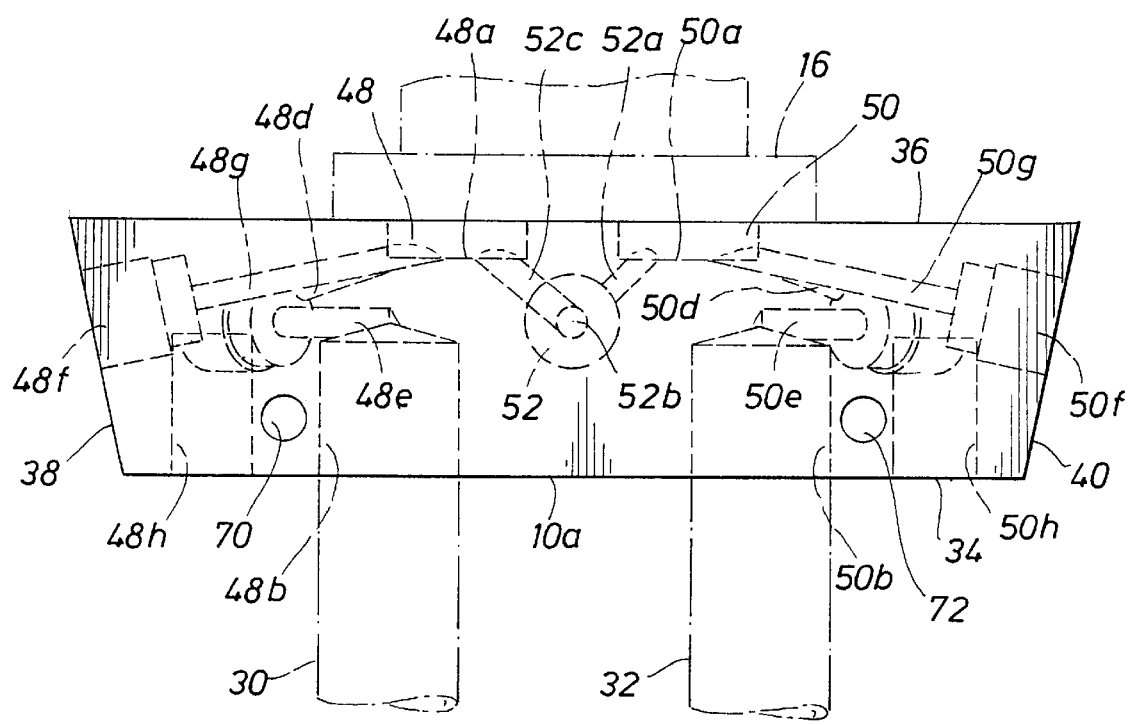
FIG. 4 is an elevational view of the manifold of the present invention.
Figure 5:
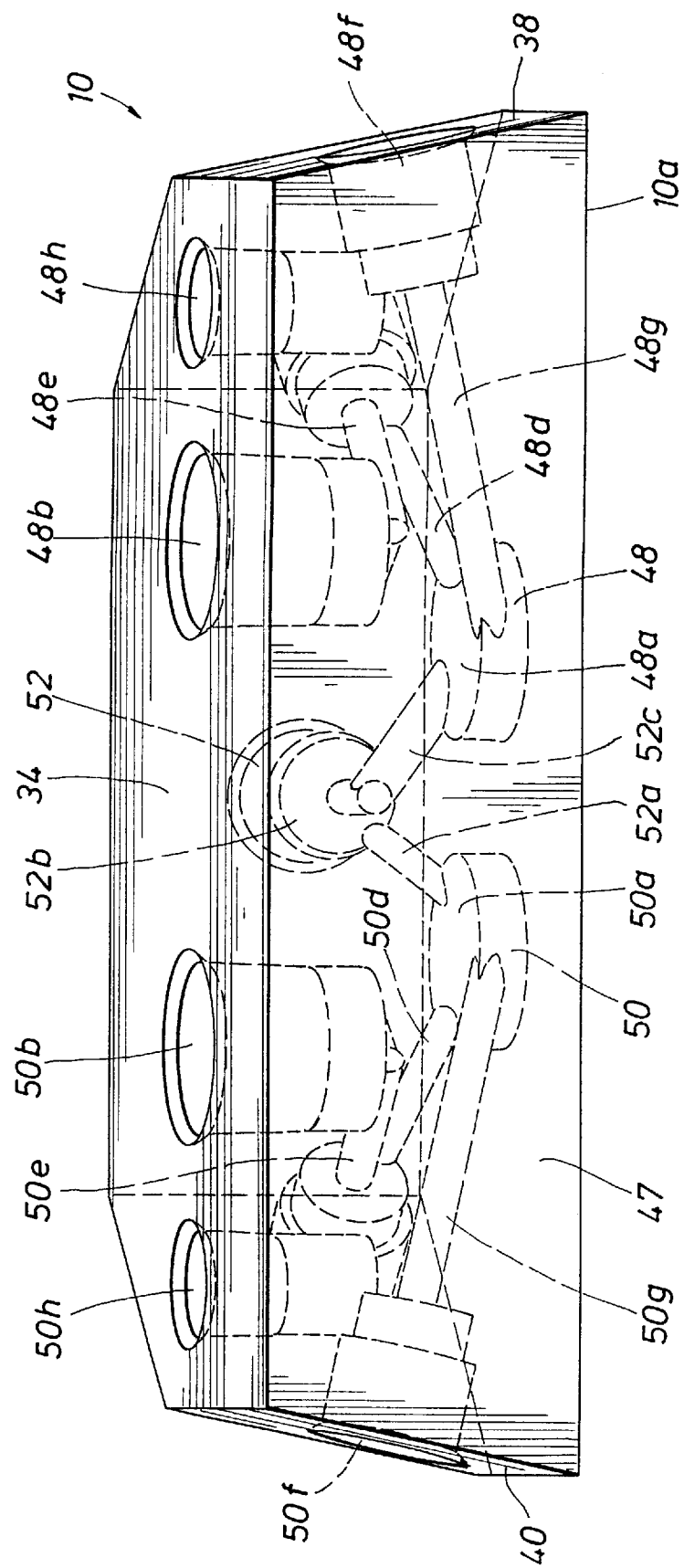
FIG. 5 is another isometric view of the manifold body of the present invention, but showing the manifold inverted from the position shown in FIG. 2.

A cylindric, high pressure vent valve cavity 48*f* is formed in first, substantially planar side surface 38 and is in open communication with high pressure outlet 48 via passageway 48*g*, passageway 48*g* opening into outlet 48 at the intersection of the bottom wall 48*a* and the side wall thereof, valve cavity 48*f* being threaded in the well-known manner for receipt of a suitable valve. As best seen with reference to FIG. 5, passageway 48*g* is generally normal or perpendicular to first planar side surface 38 and is generally coaxial with vent valve cavity 48*f*. As can also be seen from FIG. 5, passageway 48*g* slopes in a direction away from instrument face 36, i.e., generally downward as depicted in FIG. 4 and generally upward as depicted in FIG. 5. As best seen with reference to FIG. 3, high pressure drain port 48*h* intersects vent valve cavity 48*f*, placing drain port 48*h* and vent valve cavity 48*f* in direct, fluid communication with one another without any cross-drilling. Disposed in vent valve cavity 48*f*, as shown in FIG. 1, is vent valve 28, vent valve 28 serving to control flow between passageway 48*g* and drain port 48*h* and, more generally, to control flow between outlet 48 and drain port 48*h*. To this end, when valve 28 is in the closed position, open fluid communication between valve cavity 48*f* and drain port 48*h* is shut off.

With reference now to the low pressure flow pathway, a low pressure cylindric, block valve cavity 50*c* is formed in second, substantially planar side surface 46 and is connected to low pressure outlet 50 via a straight passageway 50*d*, passageway 50*d* opening into cylindric cavity 50 through the juncture of bottom wall 50*a* and the side wall thereof and sloping in a direction away from face 36. Low pressure block valve cavity 50*c* is also connected to low pressure inlet 50*b* via a straight passageway 50*e*. With low pressure block valve 22 (see FIG. 1) threadedly received in low pressure valve cavity 50*c*, it will be seen that fluid communication between passages 50*e* and 50*d* can be controlled via the opening and closing of valve 22. Accordingly, fluid flow between the inlet 50*b* and outlet 50 can be controlled. Formed in second, substantially planar side surface 40 is cylindric, vent valve cavity 50*f*, low pressure vent valve cavity 50*f* being threaded and connected to low pressure outlet 50 via a straight passageway 50*g*, passageway 50*g* being substantially normal to surface 40 and opening into cylindric cavity 50 through the intersection of the bottom wall 50*a* and the side wall thereof. As best seen with reference to FIGS. 4 and 5, passageway 50*g* slopes in a direction away from instrument face 36, i.e., in a generally downward direction as shown in FIG. 4 and in a generally upward direction as shown in FIG. 5. Vent valve cavity 50*f* intersects, and accordingly is in direct fluid communication, with drain port 50*h* without any cross-drilling. With valve 24 threadedly received in vent valve cavity 50*f*, it will be seen that fluid communication from passageway 50*g* to vent port 50*h* through vent valve cavity 50*f* can be controlled.

A cylindric equalizer valve cavity 52 is formed in third, substantially planar side surface 42 of manifold body 10*a*. Equalizer valve cavity 52, threaded in the conventional manner, is connected by a straight passageway 52*a* to low pressure outlet 50 and to high pressure outlet 48 via intersecting passageways 52*b* and 52*c*, passageways 52*a* and 52*c* opening into outlets 50 and 48, respectively, at the intersections of the bottom surfaces 50*a* and 48*a*, respectively, and the side walls, respectively, of cavities 50 and 48. With equalizer valve 20 disposed in equalizer valve cavity 52 as shown in FIG. 1, it can be seen that open fluid communication between high pressure outlet 48 and low pressure outlet 50 can be established whereby either the low or the high pressure fluid pressure can be directed to both the high and low pressure inlets, respectively, of the pressure sensors in housing 16. As best seen with reference to FIG. 3, manifold body 10a is provided with four throughbores 54, 56, 58, and 60 that are used, in conjunction with bolts not shown, to mount manifold body 10a to transmitter 12, transducer housing 16 being provided with threaded bores (not shown) in register with throughbores 54, 56, 58, and 60 and in which such bolts are threadedly received. It will be appreciated that instrument face 36 is sealingly mated to the face of transducer housing 16.

Thus, as described above and as used herein, "wafer-style" refers to a manifold body that is monolithic, i.e., formed from a single block of material, has opposed, spaced faces, e.g., instrument face 36 and process face 34, that are substantially planar and parallel to each other, has a thickness between such opposed faces that is less than either the width or length of the faces, and wherein all valves are disposed in a peripheral wall that interconnects the opposed faces—i.e., no valves are disposed in either of the two opposed faces.

The self-draining feature of the manifold of the present invention is best seen with reference to FIGS. 1, 2, and 4 wherein the manifold is shown as mounted in the conventional fashion to obtain pressure measurements from a pressurized flowing gas source. In such a configuration, the main flow source is generally below the manifold, the pressure sensor/transmitter 12 being secured vertically above and to the manifold 10. It can be seen that should any liquid collect or condense in either of cylindric outlets 48 or 50, and under the assumption that valves 24 and 28, respectively, are open, the collected liquid will drain by gravity through passageways 48g and 50g out drain ports 48h and 50h, respectively. Likewise, it can be seen that passageways 48d, 50d, 52b, and 52c are all generally sloped in a direction away from instrument face 36, i.e., toward face 34, further enhancing gravity flow of any fluid that would collect or pool in the relatively shallow cylindric cavities 48 and 50. As noted above, such liquid, if it contains corrosive materials, can damage the diaphragms and, if it freezes, cause rupturing of the diaphragms.

With reference to FIG. 5, the manifold is shown as generally inverted from the position shown in FIGS. 1, 2, and 4. Generally, but not always, manifold 10 is positioned as shown in FIG. 5 when the fluid being measured is a liquid, in which event the transmitter 12 is mounted vertically below manifold 10, the process fluid from the main flow line entering manifold 10 from above. Once again, the unique design of the passageway system of the manifold of the present invention provides unexpected benefits. As noted above, when performing differential pressure measurements on a liquid medium, it is important that any gas bubbles not be in contact with the diaphragms used in the pressure sensor section of the transmitter lest false readings be obtained. It can quickly be seen that any gas bubbles collecting in cylindric cavities 48 and 50 will tend to escape from cavities 48 and 50 and move upwardly through straight passageways 48g and 50g, respectively. Indeed, since, when in the position shown in FIG. 5, all of the passageways opening into either cylindric cavities 48 and 50 slope upwardly away from face 36, gas bubble accumulation is virtually precluded in cylindric cavities 48 and 50 because of the natural tendency of the gas bubbles to rise upwardly through the straight, upwardly sloped passageways.

A desirable feature of the manifold of the present invention is that there are no construction holes or bores that are used solely for the purpose of drilling any of the passageways connecting the various inlets, outlets, valve cavities, and drain ports. This is a significant advantage for several reasons. For one, when construction holes are employed, it is necessary that they be plugged to avoid leak paths out of the manifold. Additionally, such construction holes almost invariably provide dead spots where liquid or gas bubbles can be trapped. Furthermore, such construction holes may unnecessarily affect the structural integrity of the manifold body, which can result in serious consequences, depending upon the pressures being handled by the manifold.

As can be best seen with reference to FIGS. 1 and 4, the equalizer valve 20 and the block valves 22 and 26 have the axes of their operating stems generally perpendicular to side surfaces 42, 44, and 46, respectively. Stated differently, the valve cavities 52, 48c, and 50c can be bisected by an imaginary plane passing through said valve cavities and generally parallel to instrument face 36. On the other hand, since vent valve cavities 48f and 50f are generally coaxial with passageways 48g and 50g, respectively, valves 24 and 28 are canted relative to valves 20, 22, and 26. In particular, as shown in FIG. 1, valves 24 and 28 are canted downwardly relative to valves 20, 22, and 26. Accordingly, the vent valves 24 and 28 readily stand out from the other valves, minimizing the likelihood that an operator will actuate the wrong valve(s).

The manifold of the present invention solves the problem addressed in U.S. Pat. No. 5,277,224 with respect to so-called "smart" pressure transmitters, i.e., transmitters capable of transmitting both relative and absolute pressure values. The introduction of the smart transmitters, exemplified by the *3051*C Differential Pressure Transmitter marketed by Rosemount, Inc., Eden Prairie, Minn., resulted in a reduction of the distance between the centers of the inlets to the transmitter from the previous industry standard of 2-⅛" to 1-¼". However, while the distance between the centers of the inlets of the differential pressure transmitters was reduced, the process fluid inlets from the main flow line remained on 2-⅛" centers. As taught in U.S. Pat. No. 5,277,224, one solution to this problem was to provide what is referred to a co-planar flange interfaced between the manifold and the transmitter, the co-planar flange, essentially a flow diverter, serving the purpose of providing the needed 1-¼" outlets that would be in register with the transmitter inlets while maintaining the 2-⅛" spacing at the outlets of the existing manifolds. The manifold of the present invention requires no such co-planar flange or diverter as it is able to connect, on the process side, with the existing process fluid taps located on 2-⅛" centers and directly couple to the smart transmitter 12 having inlets on 1-¼" centers; i.e., outlets 48 and 50 are in register with the inlets to the pressure transmitter 12.

The unique construction of the manifold body of the present invention minimizes manufacturing costs by minimizing cross-drilling to connect the various passageways and by utilizing valve cavities and other operational ports to form the various passageways necessary to provide the desired fluid communication pathways through the manifold body.

The foregoing description and examples illustrate selected embodiments of the present invention. In light thereof, variations and modifications will be suggested to one skilled in the art, all of which are in the spirit and purview of this invention.

What is claimed is:

1. A valve mazifold adapted to be positioned between a main flow line and a pressure sensor to control fluid flow from said main flow line to said pressure sensor, comprising:

a manifold body having a first face, an opposed, substantially planar second face, and a peripheral wall, a high pressure inlet, a low pressure inlet, a high pressure drain port, and a low pressure drain port being formed in said first face, a high pressure outlet and a low pressure outlet being formed in said second face;

an equalizer valve cavity formed in said peripheral wall, said equalizer valve cavity being in open flow communication with said high pressure outlet and said low pressure outlet;

an equalizer valve disposed in said equalizer valve cavity for controlling fluid communication between said high pressure outlet and said low pressure outlet;

a high pressure block valve cavity formed in said peripheral wall said high pressure block valve cavity, said high pressure inlet, and said high pressure outlet being interconnected, said high pressure block valve cavity and said high pressure outlet being connected by a first, straight passageway;

high pressure block valve cavity disposed in said high pressure valve cavity for controlling fluid communication between said high pressure inlet and said high pressure outlet;

a high pressure vent valve cavity formed in a first, substantially planar side surface of said peripheral wall, said first side surface being coincident with an imaginary plane forming an acute angle with said second face;

a straight, high pressure vent passageway connecting said high pressure vent valve cavity and said high pressure outlet, said high pressure vent passageway sloping in a direction away from said second face and being normal to said first side surface, said high pressure vent valve cavity and said high pressure drain port being connected;

a high pressure vent valve disposed in said high pressure vent valve cavity for controlling fluid communication between said high pressure outlet and said high pressure drain port;

a low pressure block valve cavity formed in said peripheral wall, said low pressure block valve cavity, said low pressure inlet, and said low pressure outlet being interconnected, said low pressure block valve cavity and said low pressure outlet being connected by a second straight passageway;

a low pressure block valve disposed in low pressure block valve cavity for controlling fluid communication between said low pressure inlet and said low pressure outlet;

a low pressure vent valve cavity formed in a second, substantially planar side surface of said peripheral wall, said second side surface being coincident with an imaginary plane forming an acute angle with said second face and being opposed to said first side surface;

a straight, low pressure vent passageway connecting said low pressure vent valve cavity and said low pressure outlet, said low pressure vent passageway sloping in a direction away from said second face and being normal to said second side surface, said low pressure vent valve cavity and said low pressure drain port being connected, and a low pressure vent valve disposed in said low pressure vent valve cavity for controlling fluid communication between said low pressure outlet and said low pressure drain port said peripheral wall including a third side surface a fourth side surface, and a fifth side surface said fourth side surface being disposed between said first side surface and said third side surface, said fifth side surface being disposed between said second side surface and said third side surface, said fourth side surface and said fifth side surface forming obtuse angles with said third side surface, said equalizer valve cavity being disposed in said third side surface, said high pressure block valve cavity being disposed in said fourth side surface and said low pressure block valve cavity being disposed in said fifth side surface.

2. The valve manifold of claim 1 wherein said high pressure vent valve cavity and said high pressure drain port intersect and said low pressure vent valve cavity and said low pressure drain port intersect.

3. The valve manifold of claim 1 wherein said high pressure block valve cavity is connected to said high pressure outlet by a first, straight high pressure passageway and said low pressure block valve cavity is connected to said low pressure outlet by a first, straight low pressure passageway.

4. The valve manifold of claim 3 wherein said high pressure and low pressure passageways slope in a direction away from said second face.

5. The valve manifold of claim 4 wherein said high pressure block valve cavity is connected to said high pressure inlet by a second, straight high pressure passageway and said low pressure block valve cavity is connected to said low pressure inlet by a second, straight low pressure passageway.

6. The valve manifold of claim 1 wherein said high and low pressure outlets comprise cylindric cavities each having a substantially planar bottom surface and a cylindrical side wall and said high pressure and low pressure vent passageways open into respective ones of said cylindric cavities through respective ones of said intersections of said bottom surfaces and said cylindrical side walls.

7. The valve manifold of claim 1 wherein said first face of said manifold body is substantially planar and parallel to said second face of said manifold body.

8. The valve manifold of claim 1 wherein said manifold body is free of any construction holes used solely for forming any of said passageways.

9. The valve manifold of claim 1 wherein any passageway opening into either of said high pressure or low pressure outlets slopes away from said second face.

* * * * *